United States Patent [19]

Rocheleau

[11] 4,243,843

[45] Jan. 6, 1981

[54] COARSE POSITION DIGITIZER

[75] Inventor: Richard T. Rocheleau, Danbury, Conn.

[73] Assignee: Summagraphics Corporation, Fairfield, Conn.

[21] Appl. No.: 14,137

[22] Filed: Feb. 22, 1979

[51] Int. Cl.² ............................................. G08C 21/00
[52] U.S. Cl. .................................................... 178/19
[58] Field of Search ........................... 178/18, 19, 20; 340/347 AD, 146.3 SY

[56] References Cited

U.S. PATENT DOCUMENTS

| | | | |
|---|---|---|---|
| 3,904,822 | 9/1975 | Kamm et al. | 178/19 |
| 4,054,746 | 10/1977 | Kamm | 178/19 |
| 4,088,842 | 5/1978 | Ikedo | 178/19 |

Primary Examiner—Thomas A. Robinson
Attorney, Agent, or Firm—Daniel M. Rosen

[57] ABSTRACT

A method and apparatus for determining graphical coordinates includes a grid of parallel spaced conductors, a switch in series with each conductor, a cursor having an alternating magnetic field for inducing an electric current in conductors over which it is passed and means for selectively closing the conductor switches to enable induced current flow in only one conductor at a time. The change of phase of current between conductors on either side of the cursor resulting from a circular magnetic field is detected for registering a count in a counter indicative of a coarse cursor distance from an origin axis. A count equal to a fine measurement of the distance of the cursor from a proximate conductor is added to the coarse distance count to derive a graphic coordinate.

11 Claims, 7 Drawing Figures

COARSE POSITION DIGITIZER

BACKGROUND OF THE INVENTION

Various types of digitizers are known wherein a cursor is moved over a surface beneath which there is a grid with one of the cursor or grid being energized and the other being influenced by the energization to provide a signal indicative of the cursor location with respect to the grid. It is desirable to be able to measure the distance of a point from orthogonal X and Y axes on a surface in order to determine the coordinates of the point by placing a stylus or cursor at the point without concern for keeping the cursor in engagement with the surface as it is moved from the origin at the intersection of the axes to the point. Various devices are known which accomplish this objective and some are discussed in U.S. Pat. No. 4,054,746 to Kamm for Electronic Coordinate Position Digitizing System.

In order to achieve high resolution for accurate determination of coordinates it is desirable to limit the distance range over which a fine measurement is made and to re ference the fine determination to a secondary axis which is a known distance from the parallel origin axis. As is disclosed in the above-referenced Kamm patent, a coarse grid can be used in conjunction with a fine grid and a common cursor. The coarse grid and cursor can be used to determine the element of the fine grid closest to the cursor and the fine grid and cursor can serve to determine the distance of the cursor from the closest coarse grid element with the closest coarse grid element serving as an auxiliary axis a known distance from the parallel origin axis. In one apparatus in the prior art, a coarse grid is provided adjacent a fine grid with the parallel coarse grid elements being equally spaced at one half the spacing of the fine grid elements, adjacent elements defining grid cycles, so that there are two coarse grid cycles in registration with each fine grid cycle. The coarse grid elements are sequentially energized, one at a time, and the signal induced in the inductively coupled cursor by each coarse grid element as it is energized is applied to a threshold circuit. The threshold circuit is set so that only the coarse grid element closest to the cursor will be able to provide a signal sufficient to cause an output at the threshold circuit which identifies that grid element as the one closest to the cursor. In order to resolve ambiguities it is necessary that there be two coarse grid cycles for every one fine grid cycle.

In addition to the necessity for including twice as many coarse grid cycles as there are fine grid cycles in the prior art, such coarse measuring devices suffer from another disadvantage in that they are amplitude dependent and vulnerable to the problem of amplitude dependent systems which results in erroneous data readings when the cursor is lifted from the coordinate surface or when there are line voltage fluctuations.

SUMMARY OF THE INVENTION

The invention which is taught herein overcomes the shortcomings of the prior art in providing a coarse measurement system for graphical coordinate determination which is immune to fluctuations in signal amplitudes and which can function with a coarse grid having only one element per cycle of an associated fine measuring grid. Specifically, the apparatus and method of the invention provide for a system employing a coarse grid having a plurality of substantially parallel and equally spaced conductors which can be aligned with the cycle elements of an associated fine grid, a cursor moveable over a surface proximate and parallel to the grid, the cursor being energized by a reference alternating voltage to generate a circular magnetic field capable of inducing alternating current flow in the coarse grid elements, a switching device in each coarse grid element which is energized, in sequence, to permit monitoring of induced current flow in only one element at a time, a counter which is synchronized to the reference cursor alternating voltage and selects switches in sequence for actuation to enable conduction and a phase shift detector for monitoring the phase of the current induced in each sequentially actuated switch and associated grid element so that the count in the counter at the time that a phase shift in the grid element currents is detected, is latched or held as a coarse measure of the distance of the cursor from the parallel origin axis. Two such coarse grids can be disposed orthogonally to provide two dimensional coordinate information.

It is therefore an object of the invention to provide a graphical coordinate determination system having a plurality of equally spaced conductive grid elements each of which is conductively responsive to an alternating voltage applied to a proximate cursor.

Another object of the invention is to provide a graphical coordinate determination system having a plurality of coarse grid elements in one to one correspondence with the cycles of a fine measurement grid.

Still another object of the invention is to provide a graphical coordinate determination system wherein current is induced in only one of a plurality of grid elements at a given time and the phase of the induced current is monitored.

A further object of the invention is to provide a graphical coordinate determination system wherein the location of a cursor on a grid is indicated by a change in phase of the current induced in the grid elements by the inductively coupled cursor.

A still further object of the invention is to provide a graphical coordinate determination system wherein ambiguities between a fine measurement and a coarse measurement can be resolved with a coarse grid having only one element per fine grid cycle.

Other and further objects of the invention will be apparent from the following drawings and description of a preferred embodiment in which like reference numerals are used to indicate like parts in the various views.

DESCRIPTION OF THE DRAWINGS

FIG. 5a-j shows waveforms at various points of the circuit of FIG. 2a; and

FIG. 6a-l shows waveforms at various points of the circuit of FIG. 2b.

DESCRIPTION OF THE PREFERRED EMBODIMENT

Figure 1:
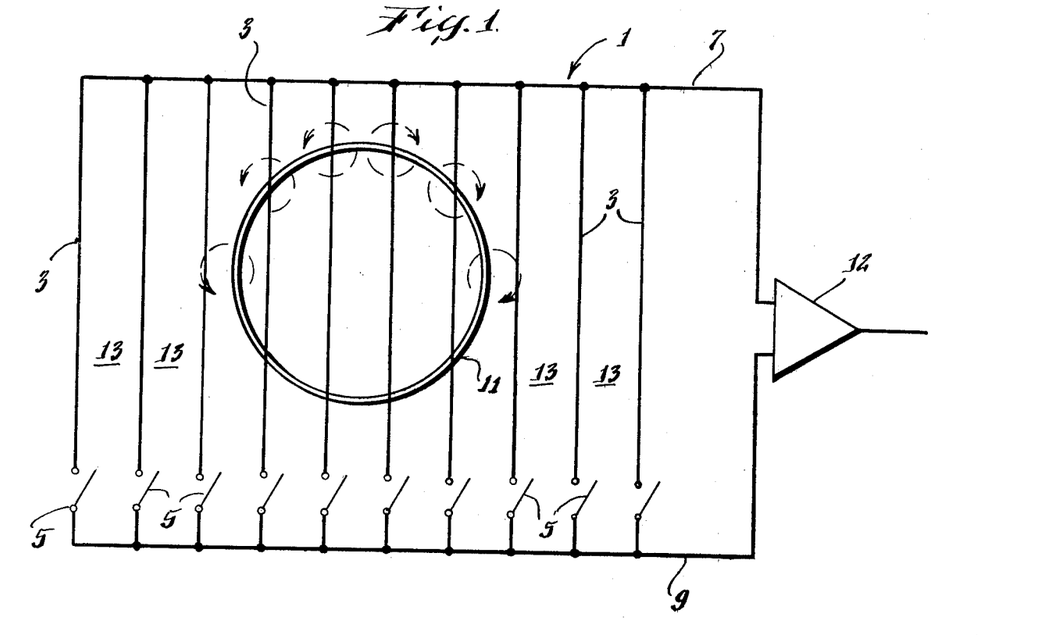
FIG. 1 is a schematic view of part of the apparatus of the preferred embodiment of the invention.

Referring now to FIG. 1 of the drawings, there is shown a coarse grid 1 having a plurality of parallel, equally spaced conductive elements 3 each of which is in series with a respective switch 5. The switches 5 can be of the mechanical type or of the solid state type which for reliability and high speed of operation is preferable. The end of each of the grid elements or conductors 3 opposite the end connected to the respective switches 5 is in electrical contact with a common grid element 7 which comprises one output terminal of the grid 1. The terminals of the switches 5 opposite the switch terminals which are connected to the conductors 3 are in electrical contact with a second common grid conductor 9 which serves as a second output terminal of the coarse grid 1.

A current amplifier 12 has two inputs which are respectively connected to the grid common conductors 7 and 9.

Disposed above the coarse grid 1 is a cursor 11 which has a toroidal core of circular cross section about which there is disposed a winding adapted to have applied to it an alternating voltage. As the alternating voltage is applied to the winding of the cursor 11 a magnetic field is set up at each point on the toroidal core in a plane transverse to the core. The changing magnetic field induces in each of the conductors 3 proximate to the core of the cursor 11 a current having an amplitude which varies with the distance of the conductor 3 from the core of the cursor 11 and a phase which is governed by the phase of the vector components of the magnetic field transverse to each conductor. As a result of the circular geometry of the core of the cursor 11 vector components of the magnetic field transverse to the conductors 3 and to the left of the center of the cursor as shown in FIG. 1 differ in phase by 180° from the transverse components of the magnetic field induced in the core of the cursor 11 to the right of the cursor's center. Hence, the currents induced in the conductors 3 to the left of center of the cursor 11 have a like phase which is opposite to the phase of the currents induced in conductors 3 to the right of center of the cursor 11.

The conductors 3 define adjacent coarse grid cycles 13 which are bounded by the conductors 3 of each adjacent pair. The function of the coarse grid and its associated circuitry which will be described in detail is to determine the coarse grid cycle 13 in which the center of the cursor 11 is disposed at any given time.

In use, each of the switches 5 is normally maintained in an open disposition as shown in FIG. 1. When it is desired to determine the coarse position of the cursor 11, that is the cycle 13 in which its center is located, the switches 5 are closed and then opened, one at a time, so that only one conductor 3 can pass an electric current induced by the alternating magnetic field of the cursor 11. The current in the grid element 3 having an associated closed switch is amplified by the amplifier 12 and the phase of the current is compared with the phase of the reference voltage which drives the cursor 11. Assuming that the axis of a coordinate system disposed between the grid and cursor is at the left of the grid as shown in FIG. 1 and parallel to the grid conductor elements 3, the switches 5 are preferably actuated for closing and then opening one at a time from left to right. Depending on the position of the cursor 11 no measurable current, a small current or a larger current may be caused to flow in the first conductor 3 when its switch 5 is actuated. The current in the next conductor having an actuated switch will differ in amplitude (unless both conductors are too far from the cursor to register any current) but will have the same phase unless the center of the cursor 11 is disposed between the conductors 3. Switching continues until a change in phase in the current applied to the amplifier 12 is detected at which time it is known that the center of the cursor 11 lies between the grid element in which a phase shift was detected and the last preceding grid element for which a switch 5 was actuated. A counter is incremented as each of the switches 5 is actuated and the count is latched or stored in response to detection of a current phase shift in the first grid conductor 3 on an opposite side of center of the cursor 11 to provide a measure of the transverse distance of the cursor 11 from the origin axis parallel to the grid conductors 3. For simplicity only one coarse grid is shown in FIG. 1. However, in a two coordinate system, a second grid can be disposed in a plane parallel to and adjacent the first grid with similar associated circuitry to provide a determination of the transverse distance from a second origin axis orthogonal to the origin axis previously mentioned as a reference, the two origin axes intersecting at the origin of the coordinate system.

To accomplish the sequential energization of the grid lines or conductors 3, the switches 5 may be activated by a multiplexer. Each conductor can be connected at one end to a common conductor forming a signal return line; the other end can be connected to a multiplex input line. An FET multiplexer can be used with 16 input lines (one for each grid line), four address lines and one enable line. In order to accommodate more than 16 grid lines more than one such multiplexer is required. To accomplish this, all multiplexer corresponding output lines can be connected together and the enable line of each multiplexer used for addressing, thereby assuring that only one multiplexer will be selected at a time. With such a circuit it is possible to select any one of the multiplexer's input lines to be connected to the common output line.

The X and Y grid patterns are preferably oriented perpendicular to each other forming the two X and Y axes. The address lines on the multiplexers are connected to the like address lines on the other multiplexers so that only four input address lines are required.

Figure 2A:
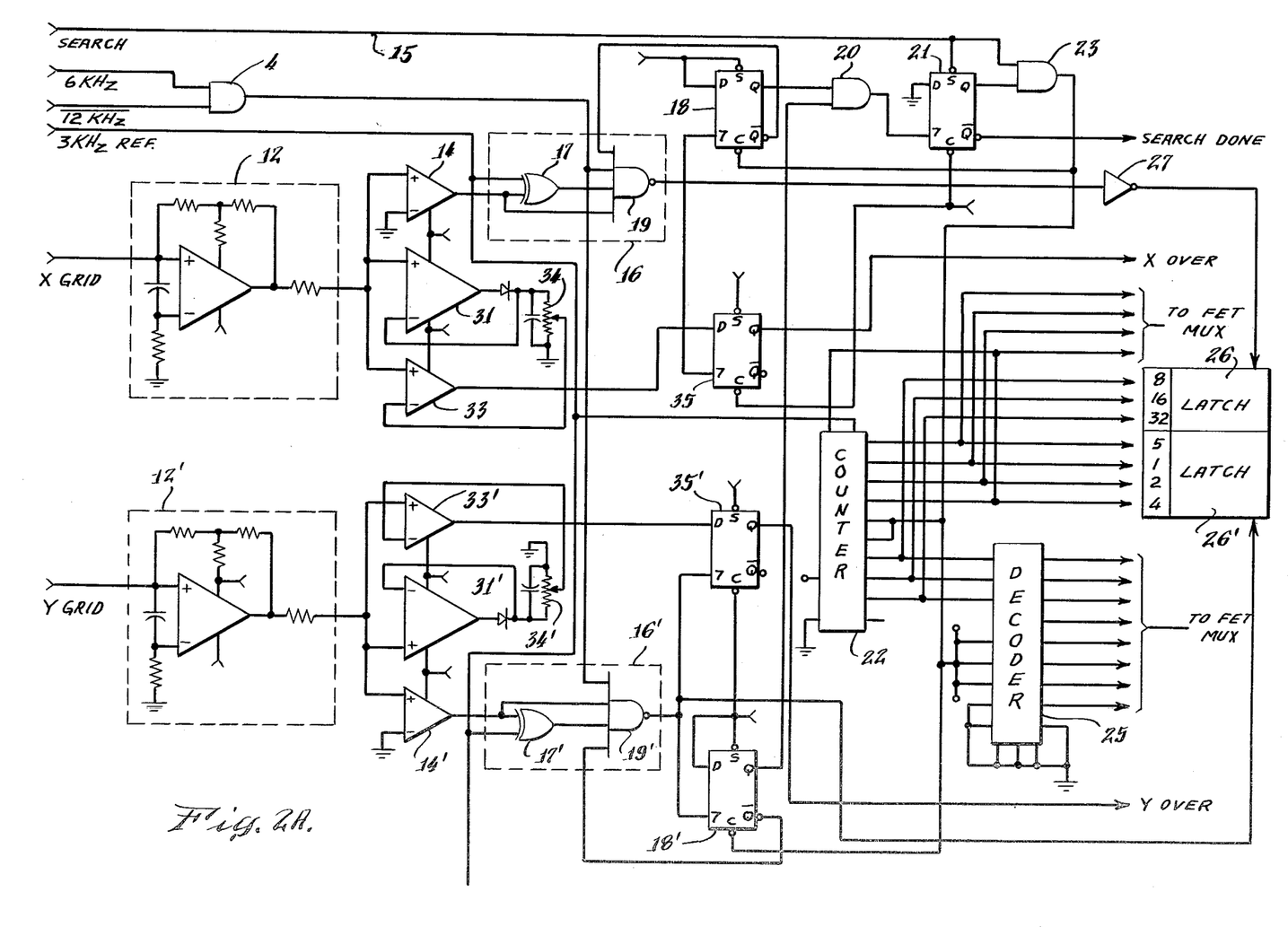
FIGS. 2a and 2b are a detailed circuit schematic diagram of the circuitry used in the preferred embodiment of the invention in conjunction with the apparatus shown in FIG. 1.

The circuitry employed for determining the coarse measurement will now be described in detail in connection with FIG. 2a of the drawings. FIG. 2a shows, schematically, a circuit which can be employed in a preferred embodiment of the invention to provide a determination of coordinate distances from orthogonal X and Y axes intersecting at the origin of a two-dimensional coordinate system. The grid 1 referred to in connection with the discussion of FIG. 1 can be considered an "X" grid with the conductors 3 being perpendicular to the X axis of the coordinate system. The amplifier 12 in FIG. 1 could then be the equivalent of the amplifier 12 which is shown in greater detail in FIG. 2. An orthogonal grid which can be referred to as a "Y" grid could be disposed immediately adjacent the X grid and would be identical to the X grid shown in FIG. 1 but rotated 90° with respect to it. The Y grid has not been separately drawn since it is identical to the X grid of FIG. 1 and functions in the same way.

Figure 2B:
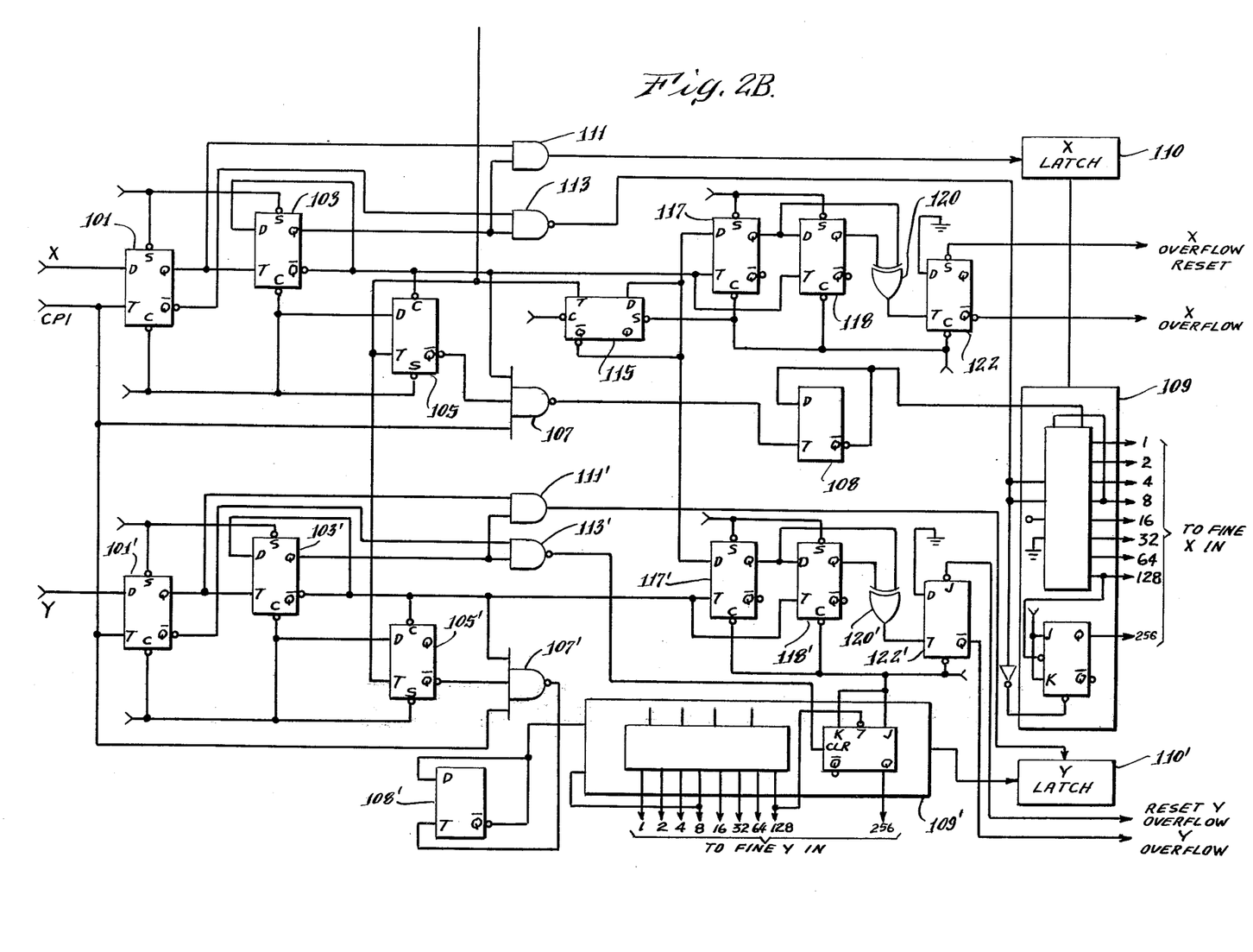

In the discussion of the circuitry of FIGS. 2a and b corresponding circuit elements associated with the X and Y grids, respectively, are designated by like reference numerals with the numerals associated with the Y grid circuit elements having a prime.

The current flowing in the X grid through terminals 7 and 9 (FIG. 1) is applied to the input of amplifier 12 and the current flowing through the terminals of a corresponding Y grid is applied to the input terminals of an amplifier 12'. The alternating voltage applied to the cursor 11 is, preferably, sinusoidal and hence so are the outputs of the amplifiers 12 and 12'. The sinusoidal outputs of the amplifiers 12 and 12' (see FIG. 5a) are applied to the respective inputs of zero crossing detectors 14 and 14'. The zero crossing detectors 14 and 14' are elements known in the art which provide a constant voltage high signal in response to the positive portion of the sine wave signal applied at their respective inputs and, upon detecting the intersection of the sine wave input signal with the zero amplitude axis, switch to a constant voltage low output signal until the next zero crossing. The result is an alternating square wave having a period and frequency equal to that of the sine wave input (see FIG. 5b).

Figure 5:
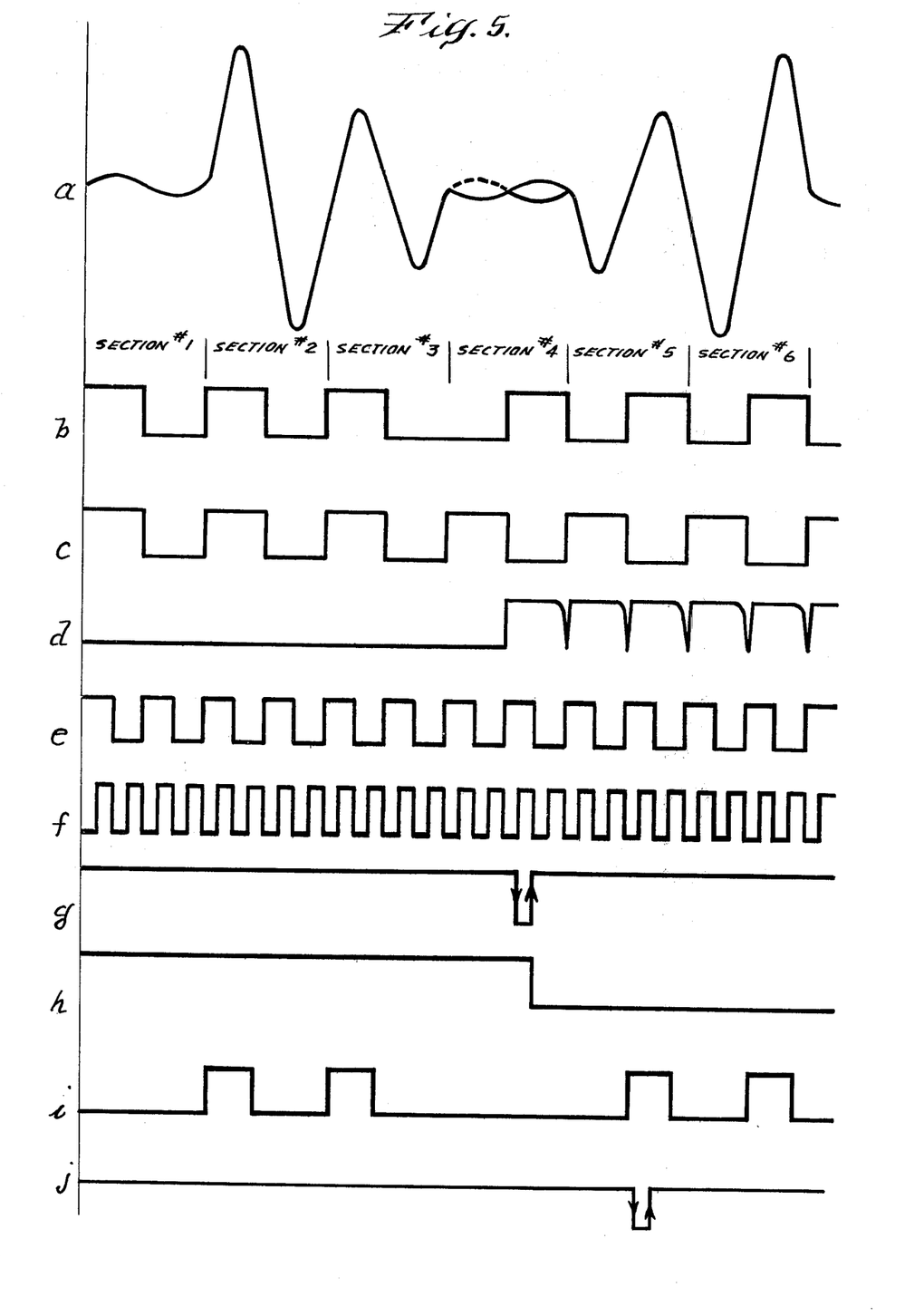

The alternating square wave outputs of the zero crossing detectors 14 and 14' are applied to the respective inputs of phase shift detector circuits 16 and 16'. The phase shift detector circuits 16 and 16' each include an exclusive OR gate 17 or 17'. The output of each exclusive OR gate 17 and 17' is low only when both of the two input signals applied to it have the same logical value (i.e. high or low). The reference voltage signal which, in the preferred embodiment of the invention has a frequency of 3 kHz (FIG. 5c) and is derived from a 3 MHz osillator, is applied to one input of the exclusive OR gates 17 and 17' and the output of the respective zero crossing detector 14 or 14' is applied to the other input of the exclusive OR gate 17 or 17'. The output (FIG. 5d) of each exclusive OR gate 17 and 17' is connected to one input of a respective quad (four-input) NAND gate 19 or 19'. The signals applied to the remaining three inputs of the NAND gate 19 or 19' are an enable signal to be discussed, the 3 kHz output of the zero crossing detector 14 or 14' and a signal equal to the sum of a 6 kHz square wave (FIG. 5e) and the inverse of a 12 kHz square wave (FIG. 5f) both of which are in phase with the 3 kHz reference signal (FIG. 5c) and logically summed in an AND gate 4. The phase shift circuits 16 and 16' sample the centers of the outputs from the X and Y zero crossing detectors (FIG. 5b) 14 and 14' and compare them to the 3 kHz reference signal (FIG. 5c). If, at the time of a comparison, the zero crossing detector output and reference signal are at opposite logical values and the enable signal is high, a low going pulse is provided at the output (FIG. 5g) of the phase shift detector 16 of 16'. Such logically opposite values first occur when the last grid element 3 in which a current is induced is on a side of the center of the cursor 11 opposite from the previously energized elements.

The outputs of the phase shift detector circuits 16 and 16' are applied to the clock inputs of respective phase shift flip-flops 18 and 18'. The Q outputs of the flip-flops 18 and 18' are normally high due to application of a high signal on a search line 15 and a concurrent high signal at the Q output of a flip-flop 21 which are logically summed in an AND gate 23 the output of which is connected to the clear inputs of flip-flops 18 and 18'. When a measurement cycle is begun by the application of a low going search pulse to line 15 the Q outputs of flip-flops 18 and 18'. When a measurement cycle is begun by the application of a low going search pulse to line 15 the Q outputs of flip-flops 18 and 18' go low as will be shown. Upon occurrence of a phase shift in the square wave signal output of the zero crossing detector 14 or 14', a low going pulse having a pulse width of approximately 80 microseconds appears at the respective output of the phase shift detector circuit 16 or 16' and is applied to the clock input of the corresponding phase shift flip-flop 18 or 18' to clock the flip-flop on the positive going edge of the pulse thereby causing its Q output to go high and its Q̄ output to go low. The Q̄ outputs (FIG. 5h) of respective flip-flops 18 and 18' are applied to respective enable inputs of the phase shift detectors 16 and 16' which are the previously mentioned enable inputs of NAND gates 19 and 19'. A low signal at either Q̄ output which occurs at the termination of the 80 microsecond pulse disables the respective phase shift detector 16 or 16' so that there is only a single pulse output from the phase shift detector 16 or 16' (see FIG. 5g) after a phase shift is detected.

Each measurement of the coarse position of the cursor 11 is initiated by applying a low going pulse to the search line 15. The low going pulse sets flip-flop 21 so that its Q output is high. The Q output of flip-flop 21 and the search pulse are both applied to AND gate 23. During the occurrence of the low search pulse the output of AND gate 23 is low. However, at the termination of the search pulse, the output of AND gate 23 goes high thereby releasing a clear condition on flip-flops 18 and 18' as well as on a binary counter 22 and 3-8 decoder 25. The counter 22 and decoder 25 control the selection and activation of the switches 5 in sequence. The counter 22 is incremented by applying the 3 KHz reference signal which is the same signal used to develop the cursor drive signal. This input signal causes the dual binary counter 22 to count, incrementing on the leading positive edge of the input signal. The first stage of the dual counter is used as a multiplexer input address starting at 0000 and incrementing on every full cycle of the 3 KHz reference signal. The second stage of the counter is connected to the 3-8 decoder 25, the outputs of which are used as the multiplexer enable signals.

The count in the counter 22 is also loaded into an X coordinate coarse latch 26 in response to the detection of a phase shift by the X phase detector 16 and into a Y coordinate coarse latch 26' in response to the detection of a phase shift by the Y phase detector 16'. The respective low output signals of NAND gates 19 and 19' resulting from phase shift detection are inverted by respective inverters 27 and 27' to form high signals which are applied to the respective latches 26 and 26'.

When each zero crossing detector output signal goes out of phase with the 3 KHz reference signal, the exclusive OR gate 17 or 17' output goes high. The 6 KHz signal is used to prevent misaligned edges of the two signals from triggering the phase detector circuit 16 or 16'. The zero crossing detector 14 or 14' output is used to enable the phase detector 16 or 16' only on the positive lobe of the amplifier 12 or 12' output sinusoidal waveform. When all of the input signals to NAND gate 19 or 19' go high the output of NAND gate 19 or 19' will go low. The low transition is inverted by an inverter 27 or 27' to provide the load signal for storing the count equal to the respective coarse X or Y coordinate.

Once a count is loaded into a latch 26 or 26' during a count cycle, it is desired to prevent loading of another value until completion of the search cycle. At the time the $\bar{Q}$ output of each flip-flop 18 and 18' goes low its Q output goes high. That Q output is applied to the input of AND gate 20. When both the X and Y phase detectors 16 and 16' clock flip-flops 18 and 18' respectively, the inputs to AND gate 20 will both go high clocking the Q output of flip-flop 21 low and disabling the counter 22 and initializing the circuitry for the next search.

FIG. 5a shows a typical output waveform from the amplifier 12 or 12'. There are six sections in the waveform where each section represents the signal in a corresponding grid wire 3 when its switch 5 is closed with the cursor 11 being centered over or close to the grid wire corresponding to section #4. Section #1 shows a small sine wave in phase with the 3 KHz Reference signal. The corresponding grid wire is to the left side of the cursor. Section #2 is a large sine wave in phase with the reference signal which indicates that its corresponding grid wire is close to the left edge of the cursor. Section #3, a smaller sine wave in phase with the reference signal indicates that its corresponding grid wire is just inside the left hand side of the cursor as seen in FIG. 1. Section #4 is a very small sine wave which could be either in phase or out of phase with the reference signal depending on which side of the cursor center its corresponding grid wire is located. Section #5 is a larger sine wave out of phase with the reference signal and corresponds to the grid wire next to the right of the cursor center. Section #6 is a larger sine wave out of phase with the reference signal corresponding to the grid wire under the right hand edge of the cursor.

When the center of the cursor is very close to a grid wire (e.g. corresponding to Section #4), the phase shift detector 16 or 16' may activate or trigger when that grid wire has its switch 5 closed or may not activate in which case it would activate when the next grid wire, that is the one corresponding to Section #5, had its switch closed. A peak detector circuit including an amplifier 31 or 31' having its output connected to a diode in series with a grounded parallel variable RC circuit and a comparator 33 or 33' are used to determine which section of the wavefrom in FIG. 5a experienced a phase shift and, hence, which conductor current flow triggered the phase shift detector 16 and 16', e.g., Section #4 or Section #5. This information is needed because the level of the signal in one section, e.g., Section #4 can become so small that the zero crossing detector 14 or 14' cannot detect it in which case the phase shift detector 16 or 16' would react to the signal in the next section, e.g., Section #5. By knowing which grid section the phase shift detection circuit triggered on, fine coordinate data can be used to determine the exact location of the cursor as will subsequently be shown.

The output of amplifier 12 or 12' (FIG. 5a) is applied to the input of amplifier 31 or 31' which is connected as a positive peak detector. The output of amplifier 31 or 31' has an amplitude equal to the peak value of the waveform in FIG. 5a. The variable resistor 34 or 34' of each RC circuit is used to adjust the amplifier output to a percentage of the peak value. The adjustment is made so that the adjusted value is lower than the positive peak value of the positive lobe in Section #5. The wiper of the variable resistor 34 or 34' is connected to the inverting input of the comparator 33 or 33'. The non-inverting input of the comparator 33 or 33' is connected to the output of amplifier 12 or 12'. The output of comparator 33 or 33' is as shown in FIG. 5(i) and is applied to the D input of a flip-flop 35 or 35'. Each of the flip-flops 35 and 35' is clocked on the positive lagging edge of output pulse from NAND gate 19 or 19'. When flip-flop 35 is clocked, its Q output has the logical value of output of comparator 33 or 33' at the time the phase shift was detected. If the Q output of flip-flop 35 or 35' is high, it is known that the value in the X or Y coarse latch 26 or 26' is that of Section #5. If low, it is that of Section #4. This arrangement resolves the ambiguity as to which grid line triggered the phase shift detector 16 or 16' even if the cursor 11 is lifted a short distance from the coordinate surface.

FIG. 5g shows the output of the phase shift detector 16 or 16' when triggering occurs at the nearest grid conductor (i.e. corresponding to Section #4). FIG. 5j shows the output of the phase shift detector 16 or 16' when triggering does not occur until the next grid line is energized (i.e. corresponding to Section #5).

The output of comparator 33 or 33' (FIG. 5i) is low in Section #4 and high in Section #5. It is this output value that controls the flip-flop 35 or 35' to provide the signal at its Q output indicative of which grid line current activated the phase shift detector.

Figure 3:
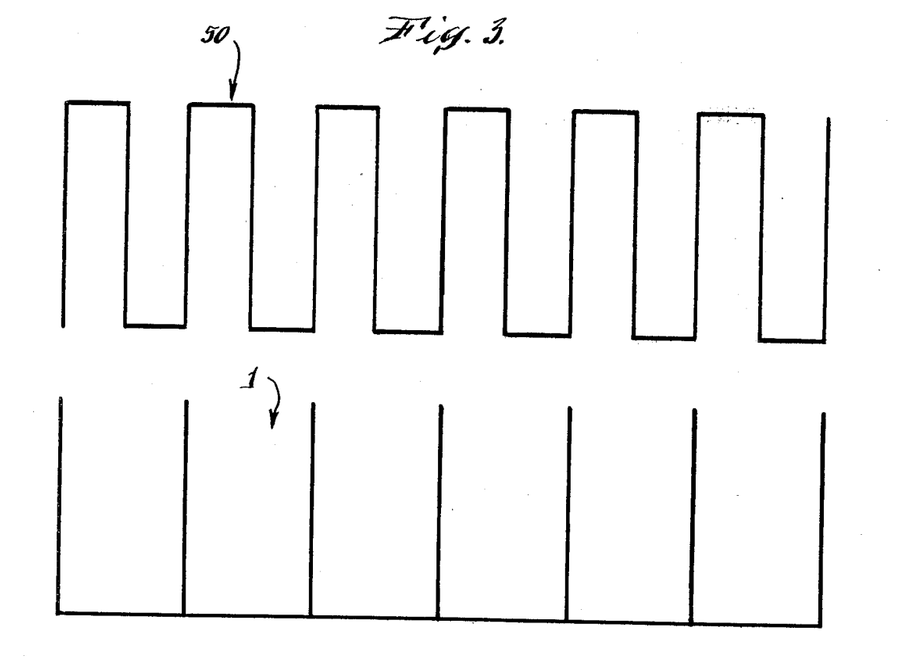
FIG. 3 is a view showing a preferred disposition of part of the apparatus of the preferred embodiment of the invention when used in its intended environment.

A fine measuring system including a separate grid can provide an indication of the coordinates of the cursor relative to the coarse X and Y coordinates which are coincident with the respective grid lines 3 immediately to the left of the center of the cursor 11 when viewed relative to the corresponding X or Y grid in an orientation as shown in FIG. 1. The alignment of a fine grid 50 with a coarse grid 1 is shown in FIG. 3. By aligning the coarse grid lines 3 with the grid lines in a fine grid defining the beginning and end of each cycle on the fine grid, the measurements from the coarse and fine measurement systems can be summed to give a final coordinate result.

The fine grid 50 provides an output signal having a phase angle which varies with grid cycle penetration by the cursor in a manner known to those skilled in the art. Such fine measurement systems are broadly discussed in Kamm U.S. Pat. No. 4,054,746, column 1, lines 25–53.

The circuitry used to determine the location of the cursor center within a grid cycle is discussed in connection with FIG. 2b. The value of the displacement or penetration into the cycle is measured from the beginning of the cycle to the cursor center. To calculate this value, the time between the positive transition of the X or Y fine grid phase shifted output signal and the positive transition of the 3 KHz reference signal as shown in FIGS. 6a and 6c is measured.

Figure 6:
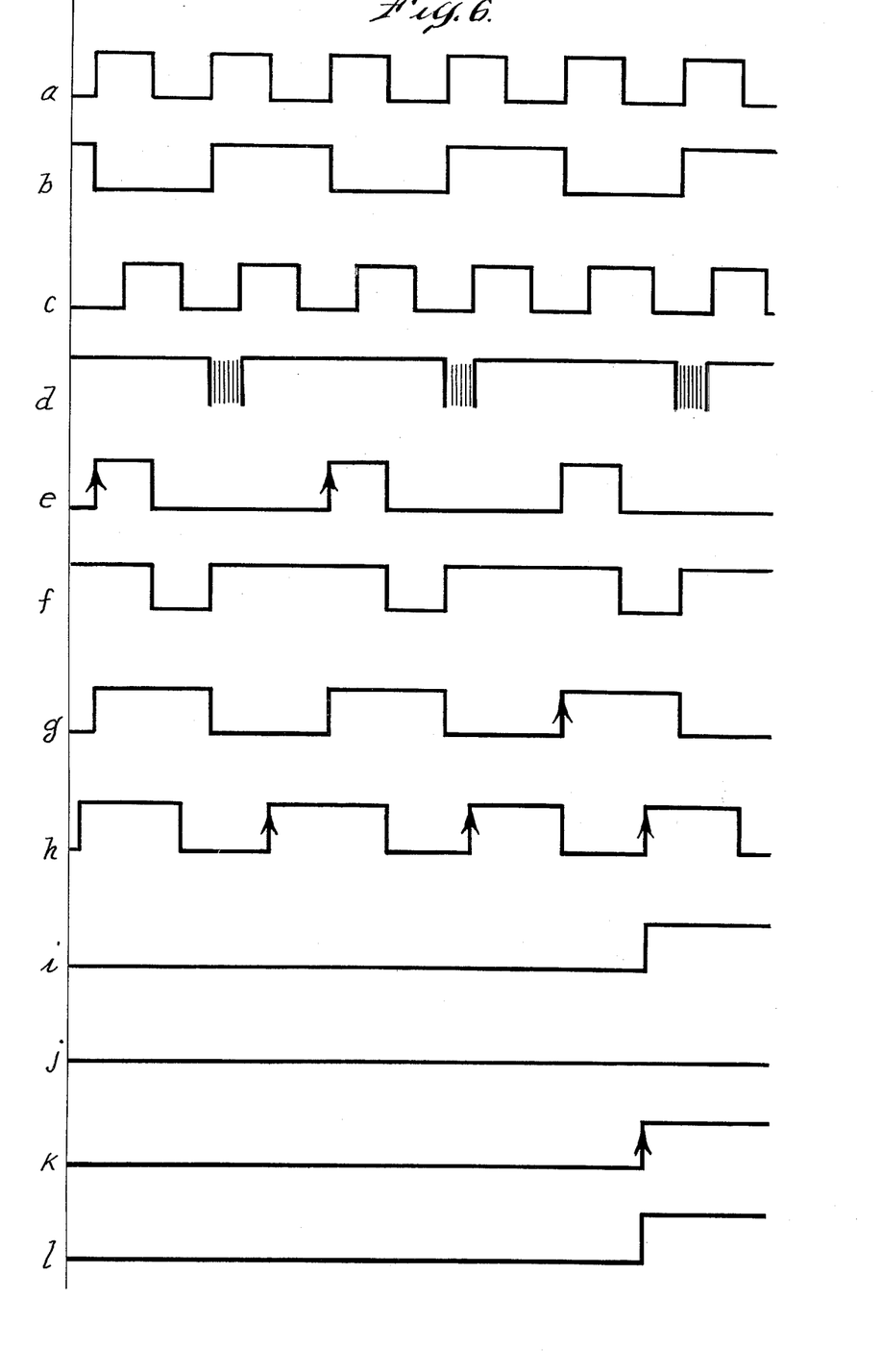

The output signal (FIG. 6(a), from the fine grid is applied to the "D" input of a flip-flop 101 or 101' where it is clocked by the 3 MHz oscillator output signal. At the Q output of flip-flop 101 or 101' is the fine grid output signal with its edge transitions synchronized to the 3 MHz oscillator. This signal is applied to the clock input of a flip flop 103 or 103' which is arranged as a divide by two circuit halving the frequency of the Q and $\bar{Q}$ outputs of flip-flop 101 or 101'. The $\bar{Q}$ output (FIG. 6b) of flip-flop 103 or 103' is applied to the clear input of a flip-flop 105 or 105'. When the $\bar{Q}$ output of flip-flop 103 or 103' goes high which happens on the positive edge of the fine grid output signal, the clear condition is removed from flip-flop 105 or 105'. The $\bar{Q}$ output of flip-flop 103 or 103' is applied to a tri-input gate 107 or 107'. The other two inputs to gate 107 or 107' are connected to the $\bar{Q}$ output of flip-flop 105 or 105' which is high due to a previous clear, and to the 3 MHz oscillator output. The oscillator signal will be clocked out of gate 107 or 107′ as shown in FIG. 6d because the other two inputs are high. The clock input of flip-flop 105 or 105′ is connected to the 3 KHz reference signal (FIG. 6c). When the positive transition of the 3 KHz reference occurs, the $\overline{Q}$ output of flip-flop 105 or 105′ will go low disabling gate 107 or 107′ and stopping the oscillator pulses. The pulse output out of gates 107 or 107′ is fed to flip-flop 108 and 108′, a divide by two flip-flop producing 0.001 inch/count (FIG. 6b), and then applied to a dual binary counter 109 or 109′ which can count to 500.

FIGS. 6e and 6f show the timing for the load and clear signals respectively. When the $\overline{Q}$ output of flip-flop 103 or 103′ goes low the Q output goes high. This Q output is applied to an AND gate 111 or 111′. Since a positive transition of the fine grid output signal X or Y (FIG. 6a) causes a change in the halved frequency signal X/2 or Y/2, the Q output of flip-flop 101 or 101′ which is also high at this time is applied to the other input of gate 111 or 111′ causing its output to go high. The leading positive edge of this output (FIG. 6e) is used to load the value at counter 109 into latches 110 or 110′.

When the Q output of flip-flop 101 or 101′ goes low, the $\overline{Q}$ output goes high. This $\overline{Q}$ output is applied to a NAND gate 113 or 113′, the other input of which is connected to the Q output of flip-flop 103 or 103′. This causes the output of gate 113 or 113′ (FIG. 6f) to go low clearing the counter 109 or 109′.

The fine position data stored in latches 110 and 110′ is used in conjunction with the coarse position data stored in latches 26 and 26′ to derive a coordinate position. The coarse search described earlier takes, in the preferred embodiment, about 40 milliseconds to perform. This means only 25 coordinates per second can be presented. To increase the frequency of coordinate presentation, an overflow signal is generated each time the cursor 11 crosses a grid conductor 3. The overflow signal is only used after the cursor has been placed on the grid and the initial coarse search has been performed. When a grid intersection is crossed the fine measurement will either change from a value of 500 to 0 or 0 to 500 (assuming a grid cycle spacing of 0.500 inches, each count in the counter 109 representing 0.001 inches) depending on the direction of movement of the cursor. Referring to FIGS. 6b and g, by loading the level of the reference/2 or $\overline{\text{REF}}/2$ signal, FIG. 6g on the positive transition of $\overline{X}/2$, FIG. 6b, and comparing the previous level with the level immediately determined, it is possible to determine when a grid line is crossed. This function is performed with the additional circuitry now to be described.

The $\overline{X}/2$ signal (FIG. 6b) is provided at the $\overline{Q}$ output of flip-flop 103 or 103′. The $\overline{\text{REF}}/2$ is signal is developed by applying the 3 KHz reference signal to a flip-flop 115 which is a divide-by-two circuit. The $\overline{Q}$ output of flip-flop 115 is $\overline{\text{REF}}/2$ (FIG. 6g). Flip-flops 117 or 117′ and 118 or 118′ are used to store the value of $\overline{\text{REF}}/2$ on two successive positive edges of $\overline{X}/2$. It can be seen that both clock inputs of flip-flops 117 or 117′ and 118 or 118′ are connected to receive $\overline{X}/2$. The D input of flip-flop 117 or 117′ receives $\overline{\text{REF}}/2$. When the first positive edge of $\overline{X}/2$ occurs, the level of the $\overline{\text{REF}}/2$ is present at the Q output (FIG. 6i) of flip-flop 117 or 117′. When the next positive transition of $\overline{X}/2$ occurs, the Q output of flip-flop 117 or 117′ which is applied to the D input of flip-flop 118 or 118′ is present at the Q output (FIG. 6g) of flip-flop 118 or 118′. The new level of $\overline{\text{REF}}/2$ is then present at the Q output of flip-flop 117 or 117′. There are now stored two successive levels of $\overline{\text{REF}}/2$ at successive positive transitions of $\overline{X}/2$.

The Q outputs of flip-flops 117 or 117′ and 118 or 118′ are connected to an exclusive OR gate 120 or 121′. If the two levels at the inputs of gate 120 or 120′ are different, the output (FIG. 6k) will go high. The outputs of gates 120 and 120′ are connected to the clock input of flip-flops 122 and 122′ respectively. When the output of gate 120 or 120′ goes high, it clocks the $\overline{Q}$ output of flip-flop 122 or 122′ (FIG. 6l) high indicating an overflow condition, (i.e. that a coarse grid line has been crossed).

The direction of the overflow can be determined by the fine coordinate data value immediately after the overflow occurs. If the fine data after the overflow is less than 250 (i.e. 0.25 inches), or half a fine grid cycle, it is known that the coarse value should be incremented because the overflow was in a positive direction, that is from 500 to 0, indicating an upward movement. If the fine data value is greater than 250, the coarse value is decremented because the overflow is assumed to be from 0 to 500, indicating a downward movement. This circuit allows the coordinate value to be updated every 2 cycles of the 3 KHz reference signal OR 0.66 ms providing an updated coordinate value 1500 times per second.

Thus it is seen that when the cursor 11 is very close to a grid conductor 3, there are two types of possible ambiguities. The first relates to whether the phase shift detector 16 or 16′ tripped on energization of the close conductor 3 or on energization of the next subsequent conductor 3. The Q output of flip-flops 35 and 35′ resolve this ambiguity and tell which is the close conductor.

The second ambiguity relates to which cycle of the coarse grid the cursor was in when a phase shift was detected, that is which side of the close grid conductor the center of the cursor was on at the time a phase shift was detected.

If the phase shift detector triggered on the energization of the closest conductor 3, i.e. the Q output of flip-flop 35 was low, and the fine grid measurement immediately after a coarse grid conductor is traversed is less than one-half the width of a fine grid cycle, i.e. less than 0.250 inches, the value in the corresponding coarse latch is correct. This can be expressed by the following equation:

$Q_{35}$ high·Fine count <250 = coarse value correct.

The other possible conditions can be described similarly:

$Q_{35}$ high·Fine count >250 = coarse value 1 too high.

$Q_{35}$ low·Fine count <250 = coarse value 1 too low.

$Q_{35}$ low·Fine count >250 = coarse value is correct.

Figure 4:
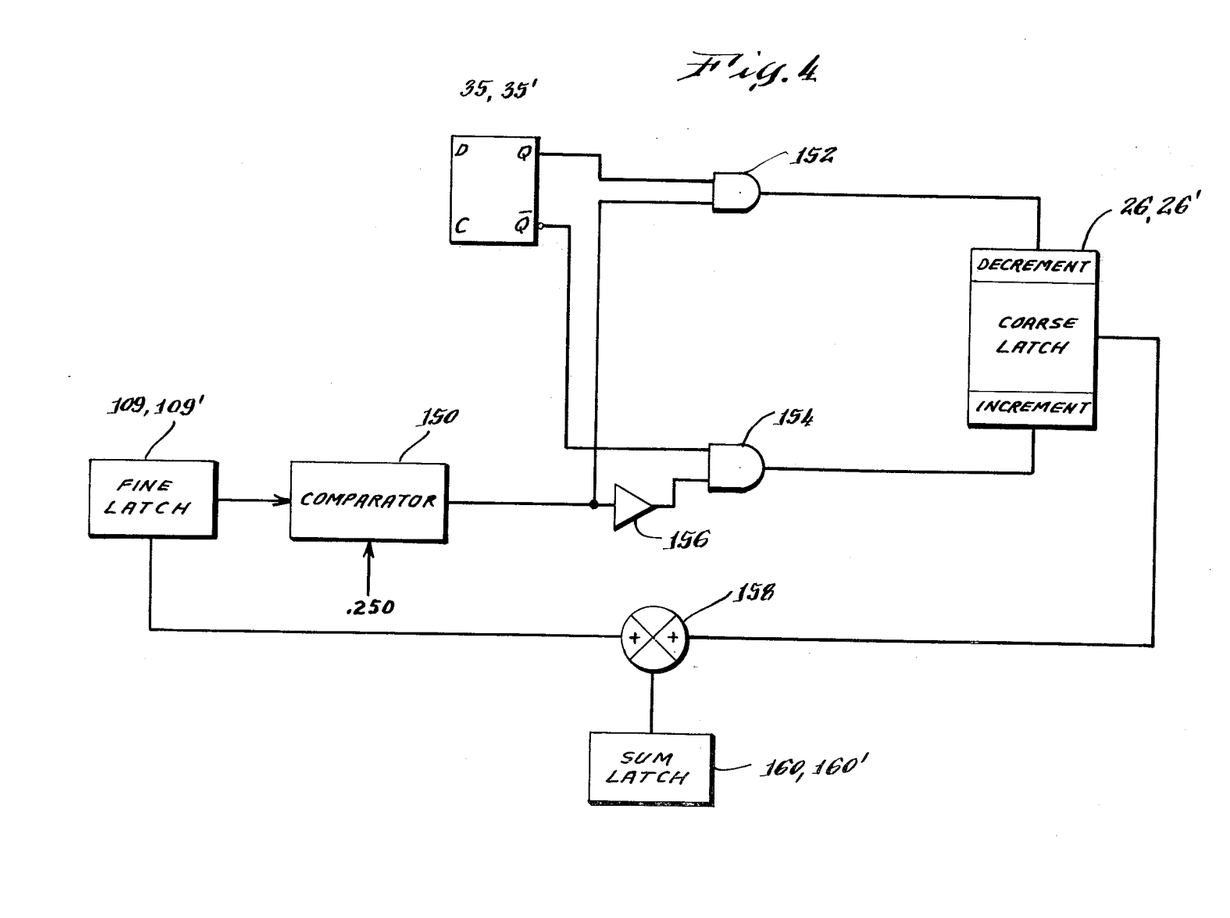
FIG. 4 is a schematic view of part of the preferred embodiment of the invention in relation to other apparatus in its intended environment.

By utilizing the above relationships, the proper coarse coordinate value can be obtained irrespective of small misalignment between the cycles of the fine and coarse grids and irrespective of insensitivity of the zero-crossing detectors to low amplitude coarse grid output signals. Apparatus for incrementing and decrementing the values stored in the coarse grid latches is shown in FIG. 4.

The $\overline{Q}$ output of flip-flop 35 or 35' is applied to one input of an AND gate 152. The output of a comparator which compares the value in the fine latch 109 or 109' with a constant of 0.250, i.e. one-half the grid cycle spacing, and which output is high when 0.250 is exceeded by the fine count is applied to the other input of AND gate 152. When both inputs are high, the value stored in the coarse latch 26 or 26' is decremented by 1.

The Q output of flip-flop 35 or 35' is applied to one input of another AND gate 154. The output of the comparator 150 is applied to the other input of AND gate 154 through an invertor 156. A high output from AND gate 154 causes the coarse count in the latch 26 or 26' to be incremented by 1. The final values stored in the fine latch 109 or 109' and the coarse latch 26 or 26' are added at summing junction 158 and stored in a sum latch 160 or 160' from which the X or Y coordinates can respectively be displayed.

It will be appreciated that variations and alterations to the preferred embodiment disclosed in this specification can be made without departing from the spirit and scope of the invention which is to be defined by the following claims.

What is claimed is:

1. Apparatus for determining the distance of a point on a surface from an axis on said surface comprising a cursor having a magnetisable element adapted to be energized by an alternating voltage,
   a grid of substantially parallel spaced conductors, said cursor being movable thereover and inductively coupled thereto,
   means for sequentially enabling only one of said conductors to conduct a current induced by said alternating voltage at any one time,
   means for comparing percentages of the amplitudes of currents induced in successively enabled conductors,
   means for sensing a change in the phase of said induced current, and means responsive to said comparing means and said sensing means for counting the number of conductors which have been enabled at the time a phase change is sensed.

2. Apparatus for determining the distance of a point on a surface from an axis on said surface comprising a grid adjacent said surface and including a plurality of substantially parallel spaced conductors,
   a cursor moveable over said surface and having an element adapted to generate a multidirectional magnetic field thereabout, said magnetic field having adjacent first and second regions with oppositely directed components of said magnetic field for inducing electric currents in proximate ones of said conductors, the currents induced in conductors closest to said first region having one phase and the current induced in conductors closest to said second region having a different phase,
   a phase shift detector having an input and an output,
   a plurality of normally open switching devices, one in circuit with each respective conductor and said phase shift detector input, each switching device completing a circuit between its respective conductor and said phase shift detector input when closed and interrupting said circuit when open,
   switch actuation means for closing and then opening each of the switching devices sequentially in one recurring switching cycle so that current can flow in only one of said conductors at any given time,
   means for comparing percentages of the amplitudes of successive currents induced in said conductors upon the closing of said switching devices, and
   a counter responsive to the commencement of each switching cycle for beginning to count and to the output of said phase shift detector for storing said count when the current applied to the input of said phase shift detector changes phase, the stored count being proportional to the distance of said cursor from said axis, said stored count also being dependent on the output of said comparing means.

3. Apparatus according to claim 2 wherein said conductors are substantially equally spaced and parallel to said axis.

4. Apparatus according to claim 2 wherein said cursor has a circular core about which there is wound a coil adapted to be excited by an alternating voltage.

5. Apparatus according to claim 4 wherein said switching devices are actuated at a frequency proportional to the frequency of said alternating voltage.

6. Apparatus according to claim 5 wherein said actuating means is responsive to said alternating voltage for sequentially actuating said switching devices.

7. Apparatus according to any of claims 2 through 6 wherein said one current phase and said different current phase are substantially 180° apart.

8. In apparatus for determining the distance of a point on a surface from an axis on said surface wherein there is a first planar grid structure having pairs of spaced parallel elements defining adjacent cycles of said grid, a cursor moveable over said surface, and fine measurement means responsive to signals transmitted between said cursor and said grid for determining the penetration distance of said cursor into said grid cycle in which said cursor is disposed the improvement comprising means for determining the grid cycle in which said cursor is disposed including
   a second planar grid adjacent said first grid, said second grid including a plurality of substantially parallel conductors adjacent ones of which are spaced apart a distance equal to the distance of one of said first grid cycles and defining cycles of said second grid in substantial alignment with said first grid cycles,
   a phase shift detector having an input and an output,
   a plurality of normally open switching devices, one in circuit with each respective conductor of said second grid and said phase shift detector, each switching device completing a circuit between its respective conductor and said phase shift detector when closed and interrupting said circuit when open,
   switch actuator means for closing and then opening each of the switching devices sequentially in one recurring switching cycle so that current can flow in only one of said conductors at any given time, and
   a counter responsive to the commencement of each switching cycle for beginning to count and to said phase shift detector for storing said count in response to the current applied to the input of said phase shift detector changing phase, the stored count being proportional to the distance of said cursor from said axis.

9. Apparatus according to claim 8 further comprising means for determining the one of two adjacent cycles of said second grid over which said cursor is disposed when said cursor is proximate an element of said second grid separating said adjacent grid cycles comprising first means for determining which of said grid elements conducted said current which said phase shift detector detected as changing phase, second means responsive to said penetration distance determining means for indicating that the cursor is in the one of said two adjacent grid cycles nearest said axis when the grid cycle penetration distance is more than one half the distance of a cycle of said first grid and for indicating that the cursor is in the one of said two adjacent grid cycles farthest from said axis when the grid cycle penetration distance is less than one half the distance of a cycle of said first grid, third means for decrementing said stored count when said next adjacent element conducted said phase shift detected current, and said cursor is in said nearest cycle, and fourth means for incrementing said stored count when said grid element conducted said phase shift detected current and said cursor is in said farthest grid cycle.

10. Apparatus according to claim 9 wherein said first means comprises means for comparing a percentage of the peak amplitude of a cycle of said current with the amplitude of the next succeeding cycle of said current and having an output signal of one magnitude when said peak amplitude is exceeded and another value when said peak amplitude is not exceeded, and means for determining the value of said comparator output signal at the time said count is stored, said value being indicative of the grid element conducting the current in which a phase shift was detected by said phase shift detector.

11. A method of determining the distance of a point on a surface from an axis on said surface comprising energizing a cursor having a magnetizable element with an alternating voltage, centering the element over said point adjacent a grid of substantially parallel spaced conductors, sequentially enabling only one of said conductors to conduct a current induced by said alternating voltage at any one time, sensing the phase of said induced current, counting the number of conductors enabled before a phase change is sensed, and determining whether the last enabled conductor before said phase change was sensed, was the conductor nearest said cursor.

* * * * *

UNITED STATES PATENT AND TRADEMARK OFFICE
CERTIFICATE OF CORRECTION

PATENT NO. : 4,243,843

DATED : January 6, 1981

INVENTOR(S) : Richard T. Rocheleau

It is certified that error appears in the above—identified patent and that said Letters Patent is hereby corrected as shown below:

Col. 5, lines 65 and 66, delete "W" and "hen" and insert -- When --.

Col. 10, line 63, delete "misalignment" and insert -- misalignments --.

Col. 11, line 1, delete "$\overline{Q}$" and insert --Q--.

Col. 11, line 9, delete "Q" and insert --$\overline{Q}$--.

Signed and Sealed this

Twenty-third Day of August 1983

[SEAL]

Attest:

GERALD J. MOSSINGHOFF

*Attesting Officer*  *Commissioner of Patents and Trademarks*